Dec. 21, 1937.  E. H. BICKLEY  2,103,055
LIQUID LEVEL INDICATING VALVE
Filed Feb. 29, 1936
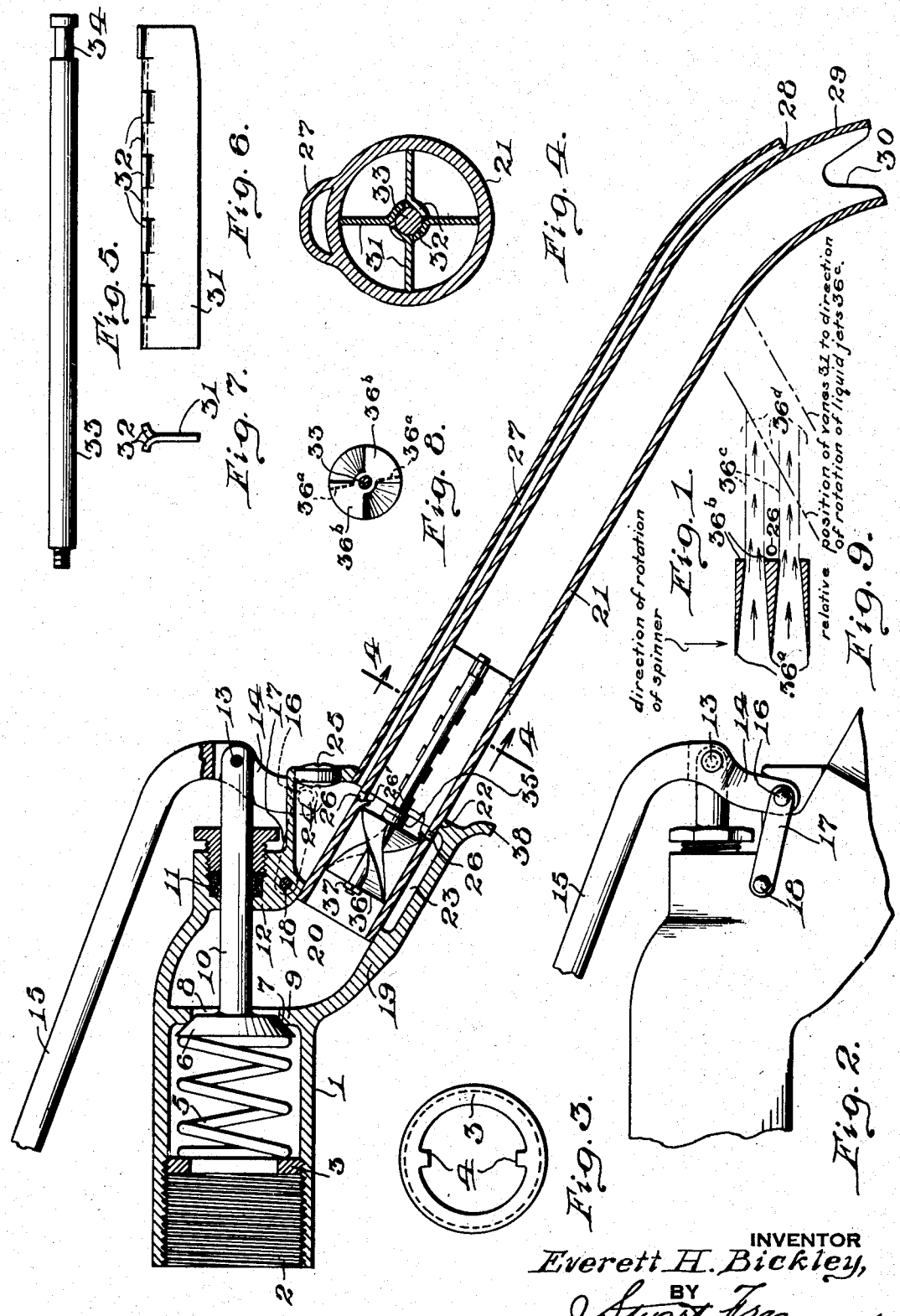
INVENTOR
Everett H. Bickley,
BY
J. Stuart Freeman,
ATTORNEY Patented Dec. 21, 1937

2,103,055

UNITED STATES PATENT OFFICE 2,103,055

LIQUID LEVEL INDICATING VALVE

Everett H. Bickley, Bala-Cynwyd, Pa.

Application February 29, 1936, Serial No. 66,385

7 Claims. (Cl. 226—66)

The object of the invention is to provide improvements in liquid level indicators, and especially in that type which is adapted for use upon, or as an integral part of, the discharge nozzle, by which gasoline or other liquid fuel, water, oil, etc., can be led into a given receptacle, and audibly indicate the instant when such liquid reaches a predetermined level, this application being an improvement upon applicant's own Patent No. 2,073,360, issued March 9, 1937.

One of the greatest needs for the present invention is in connection with the nozzles by which vehicle tanks of all kinds are filled with gasoline and oil. Much of such filling is done in respectively dark places, such as in garages even during the day, while at night it is quite generally difficult in any location to see clearly if at all the level of the fuel and much less the oil in the tanks of automobiles, trucks, airplanes, and the like. The mechanic or service station attendant is, therefore, without means of telling when the desired level of the liquid has been reached, and if he uses a lamp or flashlight for such purpose, his other hand is required, instead of both the filling and the level indicating means being carried and operated by the same hand.

Another object is, therefore, to provide in this instance a preferably unitary signalling device both within and forming a part of the control valve, whereby no light of any sort is required, but instead the operator is informed that the desired level of the liquid has been reached, by the automatic operation of the said signalling device, so that he can thereupon slacken or completely shut off the flow of liquid into such receptacle.

A further object is to provide improvements in the details of construction, by which the several parts of the improved device are assembled in said valve, as well as details of the valve itself, and the construction of the discharge end of the nozzle itself.

Still another object is to provide a valve structure comprising a spring of considerable, or at least substantial, tension to normally maintain such valve in cooperation with its seat against the pressure of a liquid, a manually actuated lever pivotally connected to the usual longitudinally movable, axially extending valve stem, and a link pivotally connected to the casing of the valve and to one end of said lever, said link extending in such angular relation to said lever and the axis of said stem, as to reduce the mechanical friction between the stem and packing gland, improve the mechanical leverage and permit operation of the valve with but little effort, in fact, with but one finger when necessary.

With these objects in mind, as thus broadly stated, the invention comprises further details of construction and operation, which are hereinafter fully brought out in conjunction with the accompanying drawing, in which Fig. 1 is a vertical longitudinal sectional view of a device comprising one embodiment of the invention; Fig. 2 is a fragmentary elevational view of a portion of the same; Fig. 3 is a plan view of the internal spring-positioning ring; Fig. 4 is a section of the line 4—4 of Fig. 1; Fig. 5 is a side elevational view of the spinner-supporting shaft; Fig. 6 is a side elevation of one of the shaft-supporting elements; Fig. 7 is an end elevation of the same; Fig. 8 is a lower end elevation of the spinner per se; and Fig. 9 is a diagrammatic view indicating the alternate jets of liquid and intervening air spaces caused by rotation of the spinner.

Referring to the drawing, there is shown a valve casing 1, which is internally threaded at its normally rear end 2, for preferably detachable connection to the free end portion of a flexible tube, pipe, or other conduit, by which liquid is to be conveyed, as for example, in the case of the filling apparatus at a gasoline, or other liquid fuel station, from a container, or pump, towards the tank of a motor vehicle, such as an automobile, aircraft, motor boat, or the like.

Within said casing is removably supported by the threads 2, a similarly threaded ring 3, which is preferably provided with suitable recesses, radial extensions, or other form of irregularities 4, by which said ring may be operatively engaged by a suitable wrench. Against the inner surface of said ring is positioned one end portion of a coiled compression spring 5, the opposite end of which spring bears against a conical valve 6, which is normally pressed yieldingly by said spring against a valve seat 7, surrounding an aperture 8 in a radially abbreviated partition 9 in said casing, said spring having considerable inherent tension, usually as much as twenty-five pounds or more.

Said valve 6 is provided with an axial stem 10, which is slidable longitudinally through a packing gland 11, of any suitable construction, in a transversely deflected portion 12 of the wall of said casing, while the outer, or free end, portion of said stem beyond said gland is pivotally connected at 13 to the bifurcated arm 14 of a lever, having a manually engageable arm 15, which over-hangs the major portion of the casing 1, while the free end of said bifurcated arm is pivotally connected at 16 to a link 17, the opposite end of which link is pivotally connected at 18 to said casing 1, and the normal position of said link, when said valve is in engagement with said seat, being angularly disposed with respect to said stem, and so related to the direction of the lever arm 14, as to permit direct manual movement of the lever arm 15 and lifting of said valve off of said seat, with a minimum pressure, against the combined tension of said spring and the pressure of a liquid also against the rear of said valve.

The normally lower wall of said casing beyond the valve 6, and beneath the deflected portion 12, is itself deflected at 19, to provide a diagonally downwardly directed channel 20 into which is secured, by any suitable means, one end of a discharge tube 21. The inner end of said tube closely fits against the adjacent sides of the channel 20, but between that point and another point 22, at which the wall of the deflected portion 19 of said casing also connects directly with said tube, there is provided an annular passageway 23, which surrounds the intervening portion of said tube and communicates upwardly with a forwardly-extending chamber 24, which communicates in turn with the exterior of said casing through the medium of an air whistle, or the like, 25.

The passageway 23 and chamber 24 communicate with the interior of the tube 21, by way of one or more apertures 26, from the rear edges of which lips 26' extend diagonally inwardly to prevent splash or "spitting" of liquid outwardly through said apertures, while into said chamber opens the upper end of an auxiliary tube 27, the lower end of which latter terminates at 28, preferably in slightly spaced relation with the free discharge end portion 29 of the tube 21. The tubes 27 and 21 in general are preferably parallel with each other, and, as shown in Figs. 1 and 4, the auxiliary or in-flowing air tube 27 may be either integral or merely unitary with the tube 21, and may be positioned upon the upper side of the latter, or instead may be positioned upon one or both of the laterally opposite sides thereof.

In passing, it should be noted that the discharge end 29 of the supply tube 21 is preferably bifurcated, as indicated at 30, to provide in effect oppositely disposed apertures, or passageways, by which liquid flowing through the tube 21 will not be interrupted in its flow, if the end 29 of said tube should contact directly with and become more or less obstructed by an inner wall, a partition, or offset, within the tank, which may be in course of receiving such liquid from the device herein described.

In the normally rearward and upper or inner end portion of the tube 21, a plurality of radially extending partitions, or vanes, 31, are shown as being provided upon their adjacent edge portions with alternately directed, deflected portions comprising ears 32, so nested with respect to one another, as indicated in Fig. 4, as to provide a fixed support for a shaft 33. The lower end of this shaft is preferably provided with an annular grooove 34, which receives one or more of the ears 32, and is thus prevented from sliding longitudinally with respect to the tube 21, with the interior surface of which said vanes frictionally cooperate and bind.

At the point where said shaft extends freely upwardly, or inwardly, from said supporting vanes, the former is surrounded by washers 35, which operate as anti-friction means to separate from said vanes a rotatable spinner element 36, which is loosely secured upon said shaft by means of a nut 37, or the like.

This element comprises spirally arranged blades, the upper or inner edges 36a of which are relatively sharp, while their lower or outer end portions 36b broaden out to possibly as much as a 90° extent. The so-called spinner, when operatively mounted, is positioned slightly rearwardly of the lips 26' of the communicating apertures 26, hereinbefore described, or in the lead of said apertures, as related to liquid flowing through the device, so that said spinner rotates, and while not offering any substantial resistance to such flow does serve to interrupt the otherwise unbroken solid continuity of the same and produce alternate jets 36c and intervening air spaces 36d, said jets having a rotary motion imparted to them by the spinner, so that as they impinge thus angularly upon the successive vanes 31, they produce a practically continuous suction or pumping action, thereby drawing air continuously through said apertures 26.

As the cross-sectional area of the passageway through the whistle, or other form of signalling device 25, is considerably less than the cross-sectional area of the interior of the auxiliary tube 27, air (or other gas) with less resistance flows upwardly and inwardly through said tube, as long as its free end 28 is not obstructed. However, as soon as the level of fluid within the tank reaches the said intake end 28, and air can no longer be drawn upwardly through said auxiliary tube, the sucking of air inwardly through said apertures 26 can only be relieved by an ingress or air through a whistle 25, with an obvious result that an audible signal is thereby created. Due then to the continuous flow of air inwardly through said whistle, by the rotation of the liquid jets 36c past said apertures and their impingement against the vanes 31, the suction of air is resultingly continuous to all intents and purposes, resulting in a corresponding continuous sound being produced by the whistle, although no claim is made to the particular nature of the audible signal produced.

It should be noted that the tubes 21 and 27, along with the said whistle and spinner mechanism, may be either fixedly or detachably connected to the valve casing 1, which latter may, if desired, be provided with a lateral terminal extension 38 of any suitable shape, for "hooking" the device as a whole in a convenient inoperative position, or for limiting the extent to which the tubes 21 and 27 enter the filling aperture of a tank.

Furthermore, while the method of positioning the shaft 33 within the tube 21, as shown in the drawing, has proved to be eminently satisfactory, the operation of the general principles of the device is not limited to this exact construction. In fact, innumerable alterations may be made in the details of construction and operation of the device so long as they fall within the scope of the appended claims.

Having thus described my invention, what I claim and desire to protect by Letters Patent of the United States is:—

1. A liquid level indicator, comprising a discharge tube, having a cutaway portion in its discharge end, to permit the free flow of liquid laterally from said tube, when the outlet of said tube is obstructed by an extraneous object, an auxiliary tube having its intake end positioned in the general neighborhood of the discharge end of said first tube, said tubes communicating with each other at substantially their relatively upper end portions, such communication being within a closed chamber, a gas-actuated audible signal connecting the interior with the exterior of said chamber, and movable means in said first tube and operative under the influence of fluid flowing thru said first tube, to cause voids in such liquid and thereby draw gas thru said signal, when the intake end of said auxiliary tube is obstructed.

2. In a liquid level indicator, the combination of a tube, a rotatable spinner in said tube, a shaft to support said spinner, and vanes having portions deflected alternately in opposite directions, fixedly engaging said shaft, and portions fixedly engaging the inner walls of said tube, to fixedly position said shaft with respect to said tube.

3. In a liquid level indicator, the combination of a tube, a rotatable spinner in said tube, a shaft to support said spinner, vanes having portions deflected alternately in opposite directions, fixedly engaging said shaft, and portions fixedly engaging the inner walls of said tube, to fixedly position said shaft with respect to said tube, and means to prevent the longitudinal movement of said shaft with respect to said vanes.

4. In a liquid level indicator, the combination of a tube, a rotatable spinner in said tube, a shaft to support said spinner, and a plurality of vanes having alternately directed longitudinally interlocking deflected portions, cooperating to grip said shaft, and portions engaging and fixed with respect to the inner wall of said tube, to form a support for said shaft.

5. In a liquid level indicator, the combination of a tube, a rotatable spinner in said tube, a shaft to support said spinner, a plurality of vanes having alternately directed longitudinally interlocking deflected portions, cooperating to grip said shaft, and portions engaging and fixed with respect to the inner wall of said tube, to form a support for said shaft, and means to prevent the longitudinal movement of said shaft with respect to said vanes.

6. In a liquid level indicator, the combination of a tube, a rotatable spinner in said tube, a shaft to support said spinner, and a plurality of vanes cooperating to comprise a spider, each vane comprising a plate having an edge portion normally frictionally engaging the wall of said tube, and its opposite edge portion comprising oppositely deflected ears, and the ears of said vanes being interposed so as to form a channel in which said shaft is frictionally gripped.

7. In a liquid level indicator, the combination of a tube, a rotatable spinner in said tube, a shaft to support said spinner, and a plurality of vanes cooperating to comprise a spider, each vane comprising a plate having an edge portion normally frictionally engaging the wall of said tube, and its opposite edge portion comprising oppositely deflected ears, and the ears of said vanes being interposed so as to form a channel in which said shaft is frictionally gripped, and means to prevent the longitudinal movement of said shaft in said channel.

EVERETT H. BICKLEY.